US011607962B2

(12) United States Patent
Riley et al.

(10) Patent No.: US 11,607,962 B2
(45) Date of Patent: Mar. 21, 2023

(54) HIGH VOLTAGE BATTERY STRUCTURAL MEMBER END STABILIZER

(71) Applicant: GM GLOBAL TECHNOLOGY OPERATIONS LLC, Detroit, MI (US)

(72) Inventors: Tyler A. Riley, Macomb, MI (US); Terry A. Swartzell, Ann Arbor, MI (US); Andrew W. White, Shelby Township, MI (US); Charles E. Jensen, Shelby Township, MI (US); James A. Rochon, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 663 days.

(21) Appl. No.: 16/711,871

(22) Filed: Dec. 12, 2019

(65) Prior Publication Data
US 2021/0178912 A1   Jun. 17, 2021

(51) Int. Cl.
*B60L 50/64* (2019.01)
*B60K 1/04* (2019.01)
*H01M 50/20* (2021.01)

(52) U.S. Cl.
CPC ............... *B60L 50/64* (2019.02); *B60K 1/04* (2013.01); *H01M 50/20* (2021.01); *H01M 2220/20* (2013.01)

(58) Field of Classification Search
CPC ... B60L 50/64; H01M 50/20; H01M 2220/20; B60K 1/04

(Continued)

(56) References Cited

U.S. PATENT DOCUMENTS 8,919,473 B2 * 12/2014 Bisror .................. B60L 3/0046
180/311
8,967,312 B2 * 3/2015 Yanagi .................... B60L 50/64
180/68.5

(Continued)

FOREIGN PATENT DOCUMENTS

CN    109565011 A    4/2019
EP      2096020 A1    9/2009
(Continued)

OTHER PUBLICATIONS

Chinese Office Action Issued in Chinese Application No. 202011398666.9 dated Oct. 27, 2022; 9 Pages.

*Primary Examiner* — James A Shriver, II
*Assistant Examiner* — Hilary L Johns
(74) *Attorney, Agent, or Firm* — Cantor Colburn LLP (57) ABSTRACT

A battery enclosure, support beam for the battery enclosure and method of providing structural support to the battery enclosure. The battery enclosure includes a base having a first sidewall and a second sidewall opposite the first sidewall. The support beam extends from the first sidewall to the second sidewall. The support beam includes a body having a first beam end and a through passage. An internal stabilizer disposed within the through passage at the first beam end. The internal stabilizer includes a first stabilizer sidewall extending from a first stabilizer end to a second stabilizer end, a second stabilizer sidewall extending from the first stabilizer end to the second stabilizer end, and a bridge connecting the first stabilizer sidewall to the second stabilizer sidewall at the second stabilizer end.

15 Claims, 9 Drawing Sheets

(58) Field of Classification Search
USPC .......................................................... 180/271
See application file for complete search history.

(56) References Cited

U.S. PATENT DOCUMENTS

| | | | |
|---|---|---|---|
| 9,533,600 B1* | 1/2017 | Schwab | H01M 10/613 |
| 10,632,847 B2* | 4/2020 | Yokoyama | H01M 50/204 |
| 10,710,640 B2* | 7/2020 | Choi | B62D 29/002 |
| 2017/0036705 A1* | 2/2017 | Muramatsu | B62D 25/2036 |
| 2017/0050675 A1* | 2/2017 | Kellner | B62D 21/15 |
| 2017/0355255 A1* | 12/2017 | Brausse | B62D 21/157 |
| 2019/0184831 A1* | 6/2019 | Yokoyama | H01M 50/20 |
| 2019/0359260 A1* | 11/2019 | Tsuyuzaki | B62D 25/2036 |
| 2020/0031399 A1 | 1/2020 | Matsuda et al. | |
| 2021/0170853 A1* | 6/2021 | Schmidt | B62D 25/20 |

FOREIGN PATENT DOCUMENTS

| | | | |
|---|---|---|---|
| JP | 2018202887 A | 12/2018 | |
| KR | 970001047 A | 1/1997 | |

* cited by examiner

FIG. 9

# HIGH VOLTAGE BATTERY STRUCTURAL MEMBER END STABILIZER

INTRODUCTION

The subject disclosure relates to an automobile battery enclosure, and in particular to a beam structure of an automobile battery enclosure that resists buckling under impact.

An automobile's battery is often stored within a battery enclosure in order to protect the battery from damage during a possible vehicular impact. There is a desire to reduce the weight of the battery enclosure. However, lighter materials can introduce strength considerations, particularly for supporting members of the battery enclosure that may buckle under impact. Accordingly, it is desirable to provide a design of a support member that is lightweight and also prevents buckling under impact.

SUMMARY

In one exemplary embodiment, a support beam for a battery enclosure is disclosed. The support beam includes a body having a first beam end and a through passage, and an internal stabilizer disposed within the through passage at the first beam end, the internal stabilizer including a first stabilizer sidewall extending from a first stabilizer end to a second stabilizer end, a second stabilizer sidewall extending from the first stabilizer end and the second stabilizer end, and a bridge connecting the first stabilizer sidewall to the second stabilizer sidewall at the second stabilizer end.

In addition to one or more of the features described herein, the internal stabilizer is disposed in the through passage at the first beam end with the bridge at a selected distance from the first beam end. The internal stabilizer is disposed in the body with the first stabilizer sidewall in contact with an inner surface of a first wall of the body and the second stabilizer sidewall in contact with an inner surface of a second wall of the body. A first stabilizer flange is at the first stabilizer end of the first stabilizer sidewall and a second stabilizer flange is at the first stabilizer end of the second stabilizer sidewall. The first stabilizer flange is coupled to a first external bulkhead flange of a first external bulkhead and the second stabilizer flange is coupled to a second external bulkhead flange of a second external bulkhead. The first external bulkhead is coupled to an outer surface of the body and the second external bulkhead is coupled to an outer surface of the body. The internal stabilizer resists a buckling of the body by transmitting a load to along a length of the body.

In another exemplary embodiment, a battery enclosure is disclosed. The battery enclosure includes a base having a first sidewall and a second sidewall opposite the first sidewall, and a support beam extending from the first sidewall to the second sidewall. The support beam includes a body having a first beam end and a through passage, and an internal stabilizer disposed within the through passage at the first beam end, the internal stabilizer including a first stabilizer sidewall extending from a first stabilizer end to a second stabilizer end, a second stabilizer sidewall extending from the first stabilizer end and the second stabilizer end, and a bridge connecting the first stabilizer sidewall to the second stabilizer sidewall at the second stabilizer end.

In addition to one or more of the features described herein, the internal stabilizer is disposed in the through passage at the first beam end with the bridge at a selected distance from the first beam end. The internal stabilizer is disposed in the body with the first stabilizer sidewall in contact with an inner surface of a first wall of the body and the second stabilizer sidewall in contact with an inner surface of a second wall of the body. A first stabilizer flange is at the first stabilizer end of the first stabilizer sidewall and a second stabilizer flange is at the first stabilizer end of the second stabilizer sidewall. The first stabilizer flange is coupled to a first external bulkhead flange of a first external bulkhead and the second stabilizer flange is coupled to a second external bulkhead flange of a second external bulkhead. The first external bulkhead is coupled to an outer surface of the body and the second external bulkhead is coupled to an outer surface of the body. The internal stabilizer resists a buckling of the body by transmitting a load to along a length of the body.

In yet another exemplary embodiment, a method of providing structural support to a battery enclosure is disclosed. An internal stabilizer is disposed within a through passage at a first beam end of a body of a support beam, the internal stabilizer including a first stabilizer sidewall extending from a first stabilizer end to a second stabilizer end, a second stabilizer sidewall extending from the first stabilizer end to the second stabilizer end, and a bridge connecting the first stabilizer sidewall to the second stabilizer sidewall at the second stabilizer end. A first sidewall and a second sidewall of a base of the battery enclosure are connected via the support beam In addition to one or more of the features described herein, the method includes disposing the internal stabilizer in the through passage at the first beam end with the bridge at a selected distance from the first beam end. The internal stabilizer is disposed in the body with the first stabilizer sidewall in contact with an inner surface of a first wall of the body and the second stabilizer sidewall in contact with an inner surface of a second wall of the body. The method further includes coupling a first external bulkhead to a first wall of the body and a second external bulkhead to a second wall of the body opposite the first wall, disposing the internal stabilizer within the through passage of the body, and coupling a first stabilizer flange of the internal stabilizer to a first external bulkhead flange of the first external bulkhead and a second stabilizer flange of the internal stabilizer to a second external bulkhead flange of the second external bulkhead. The method further includes coupling the first external bulkhead to an outer surface of the first wall of the body and coupling the second external bulkhead to an outer surface of the second wall the body. The method further includes transmitting a load to along a length of the body via the internal stabilizer.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
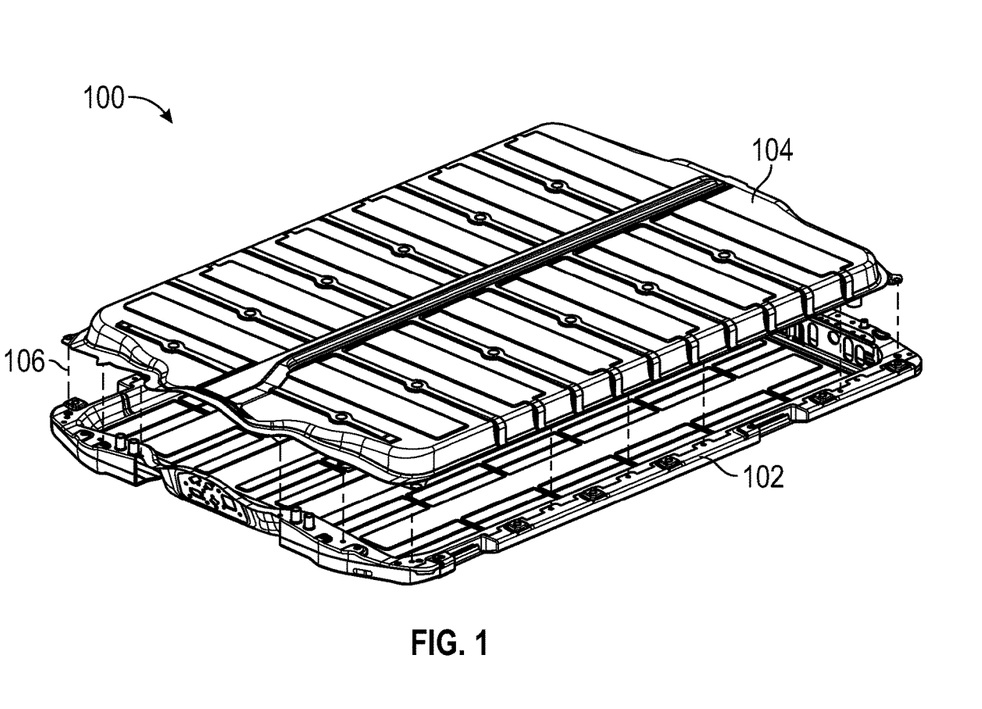
FIG. 1 shows a battery enclosure for protecting a vehicle's battery from impact.

In accordance with an exemplary embodiment, FIG. 1 shows a battery enclosure 100 for protecting a vehicle's battery assembly from impact. The battery enclosure 100 includes a base 102 and a cap 104. A battery assembly (not shown) rests on the base 102. The cap 104 is placed on top of the battery assembly. The base 102 and cap 104 are connected to each other to encapsulate the battery assembly via connection members such as rods or screws that extend along the various dotted lines 106 shown between the base 102 and the cap 104.

Figure 2:
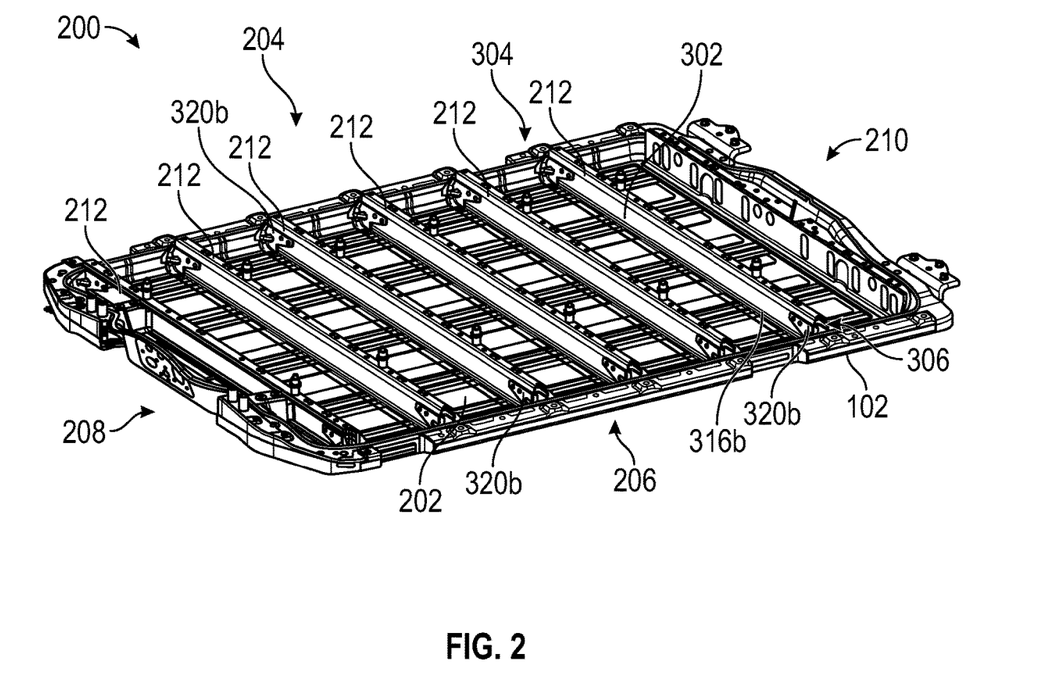
FIG. 2 shows a perspective view of the base of FIG. 1.

FIG. 2 shows a perspective view 200 of the base 102 of FIG. 1. The base 102 includes a rectangular face 202 having a first sidewall 204 and a second sidewall 206 opposite the first sidewall 204, both of which extend vertically from the face 202. The base 102 further includes a first endwall 208 and a second endwall 210 opposite the first endwall 208, both of which extend vertically from the face 202. The first sidewall 204, second sidewall 206, first endwall 208 and second endwall 210 reside along a perimeter of the face 202. A plurality of support beams 212 extend from the first sidewall 204 to the second sidewall 206. The plurality of support beams 212 support the battery assembly when the battery assembly is placed on the base 102.

Figure 3:
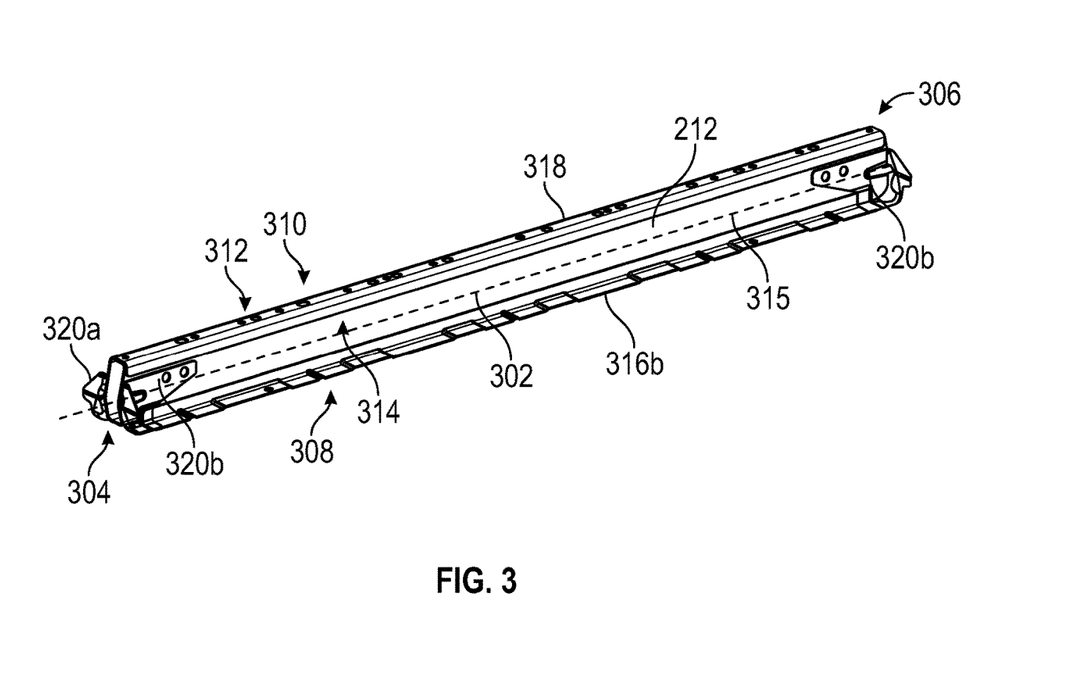
FIG. 3 shows a perspective view of a support beam of FIG. 2.

FIG. 3 shows a perspective view of a support beam 212 of FIG. 2. The support beam 212 includes a body 302 extending from a first beam end 304 to a second beam end 306 along a longitudinal axis 315. The first beam end 304 couples to the first sidewall 204 of the base 102, FIG. 2 while the second beam end 306 couples to the second sidewall 206 of the base 102. The support beam 212 includes a bottom beam side 308, top beam side 310, left beam side 312 and right beam side 314, wherein "top", "bottom", "left" and "right" are used for descriptive purposes with respect to the viewpoints shown in FIGS. 3-8. A right base support 316b is coupled to the body 302 at the bottom beam side 308. Although not shown in FIG. 2, a left base support 316a is coupled to the body 302 at the bottom beam side 308 opposite the right base support 316b. A nut channel 318 is coupled to the body 302 at the top beam side 310. A left external bulkhead 320a (also referred to herein as a "first external bulkhead") is coupled to an outer surface of the body 302 at the first beam end 304 along the left beam side 312. Similarly, a right external bulkhead 320b (also referred to herein as a "second external bulkhead") is coupled to an outer surface of the body 302 at the first beam end 304 along the right beam side 314. A similar arrangement of external bulkheads occurs at the second beam end 306.

Referring back to FIG. 2, the left external bulkhead 320a and right external bulkhead 320b secure the first beam end 304 to the first sidewall 204 of the base 102. Similarly, external bulkheads secure the second beam end 306 to the second sidewall 206. The left base support 316a and right base support 316b connect the body 302 of the support beam 212 to the face 202 of the base 102. The nut channel 318 is therefore oriented away from the face 202 and is used to secure the battery assembly within the base 102.

Figure 4:
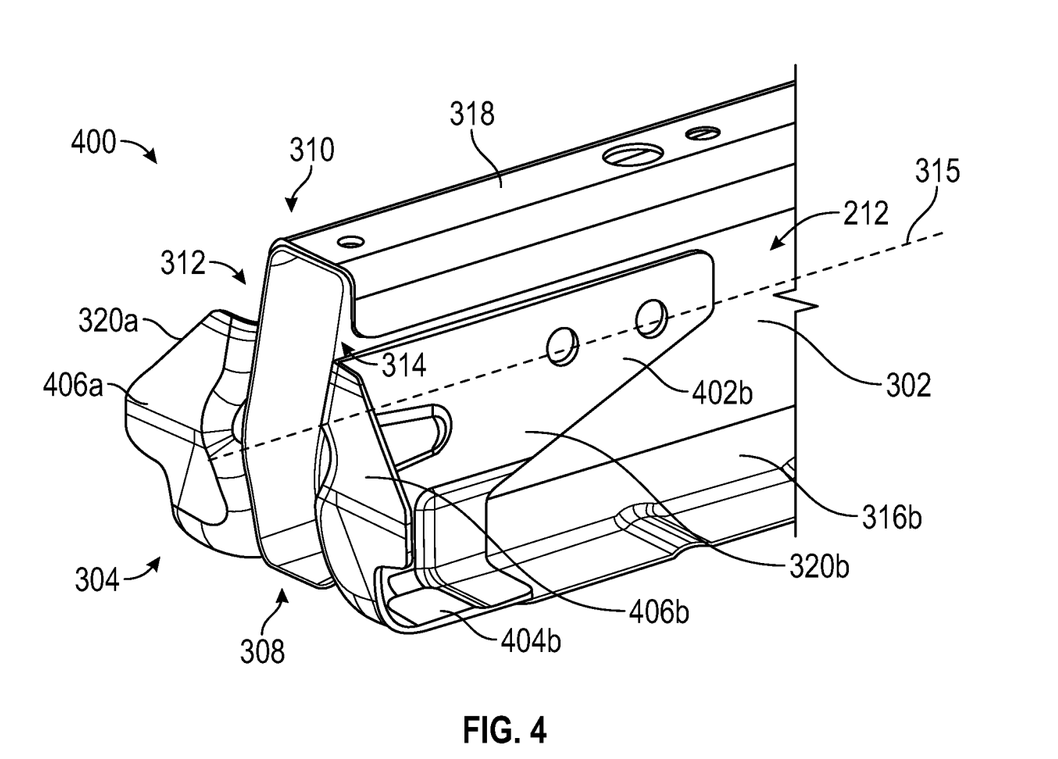
FIG. 4 shows a close-up view of the first beam end of the support beam.

FIG. 4 shows a close-up view 400 of the first beam end 304 of the support beam 212. The right external bulkhead 320b includes a right longitudinal support arm 402b, a right lateral base support arm 404b and a right external bulkhead flange 406b (also referred to herein as a "second external bulkhead flange"). The right longitudinal support arm 402b extends away from the first beam end 304 along the longitudinal axis 315 and is mated to the outer surface of the body 302. The right lateral base support arm 404b extends away from the body 302 and is mated to the right base support 316b. The right external bulkhead flange 406b provides a surface that can be mated to the first sidewall 204 of the base 102. In various embodiments, the right longitudinal support arm 402b, right lateral base support arm 404b, and right external bulkhead flange 406b can be mated to their respective mating surfaces via welding or other mating process. The left external bulkhead 320a forms a mirror reflection of the right external bulkhead 320b about a plane 515, FIG. 5 extending from the bottom beam side 308 to the top beam side 310 bisecting the body 302. The left external bulkhead 320a therefore includes a left longitudinal support arm and a left lateral base support arm, both of which are hidden from view in FIGS. 3-8, as well as left external bulkhead flange 406a (also referred to herein as a "first external bulkhead flange").

Figure 5:
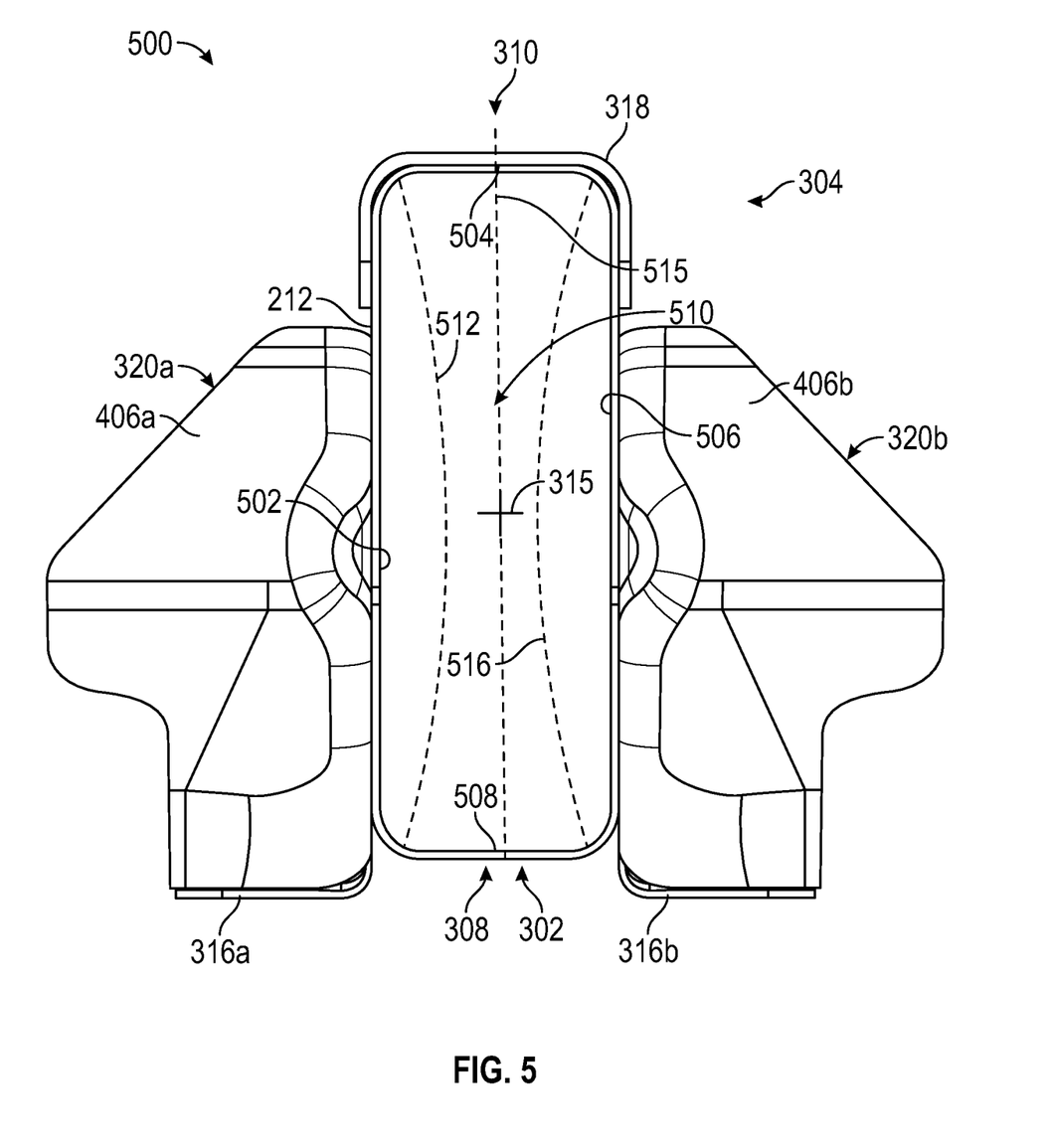
FIG. 5 shows an end view of the first beam end of the support beam.

FIG. 5 shows an end view 500 of the first beam end 304 of the support beam 212. As shown in FIG. 5, the body 302 of the support beam 212 is a single material forming a hollow shell that includes a left body side 502, top body side 504, right body side 506, and bottom body side 508. A through passage 510 of the hollow shell extends from the first beam end 304 to the second beam end 306 (not shown) along the longitudinal axis 315. The left base support 316a is coupled to the left body side 502 near the bottom beam side 308 and a right bottom base support 316b is coupled to the right body side 506 near the bottom beam side 308.

Figure 6:
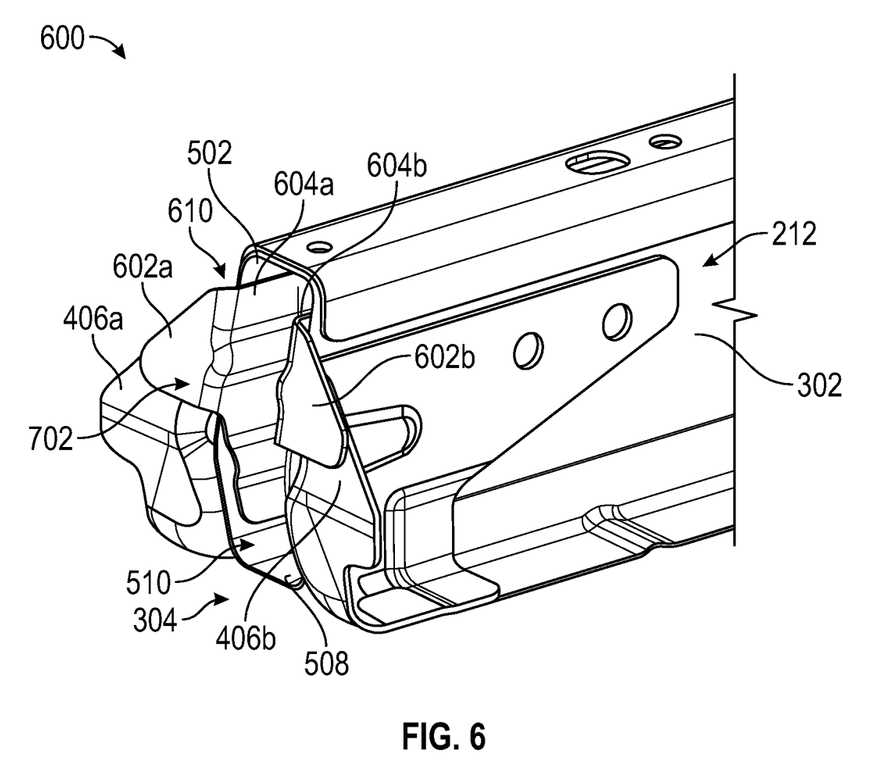
FIG. 6 shows a perspective view of the first beam end of the support beam with an internal stabilizer disposed therein.
Figure 7:
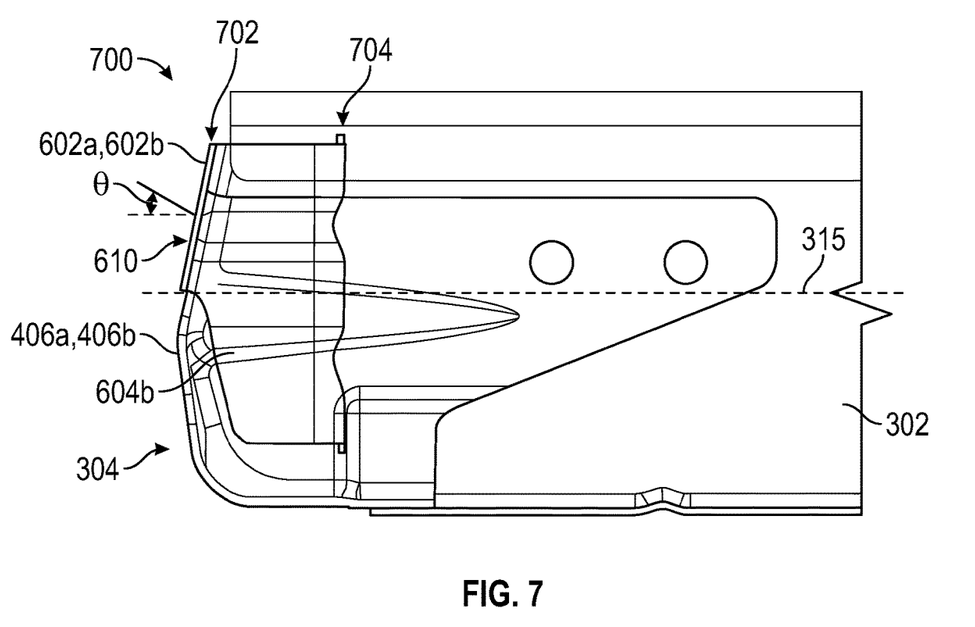
FIG. 7 shows a side view of the first beam end, illustrating the extension of the internal stabilizer along the longitudinal axis when installed at the first beam end.
Figure 8:
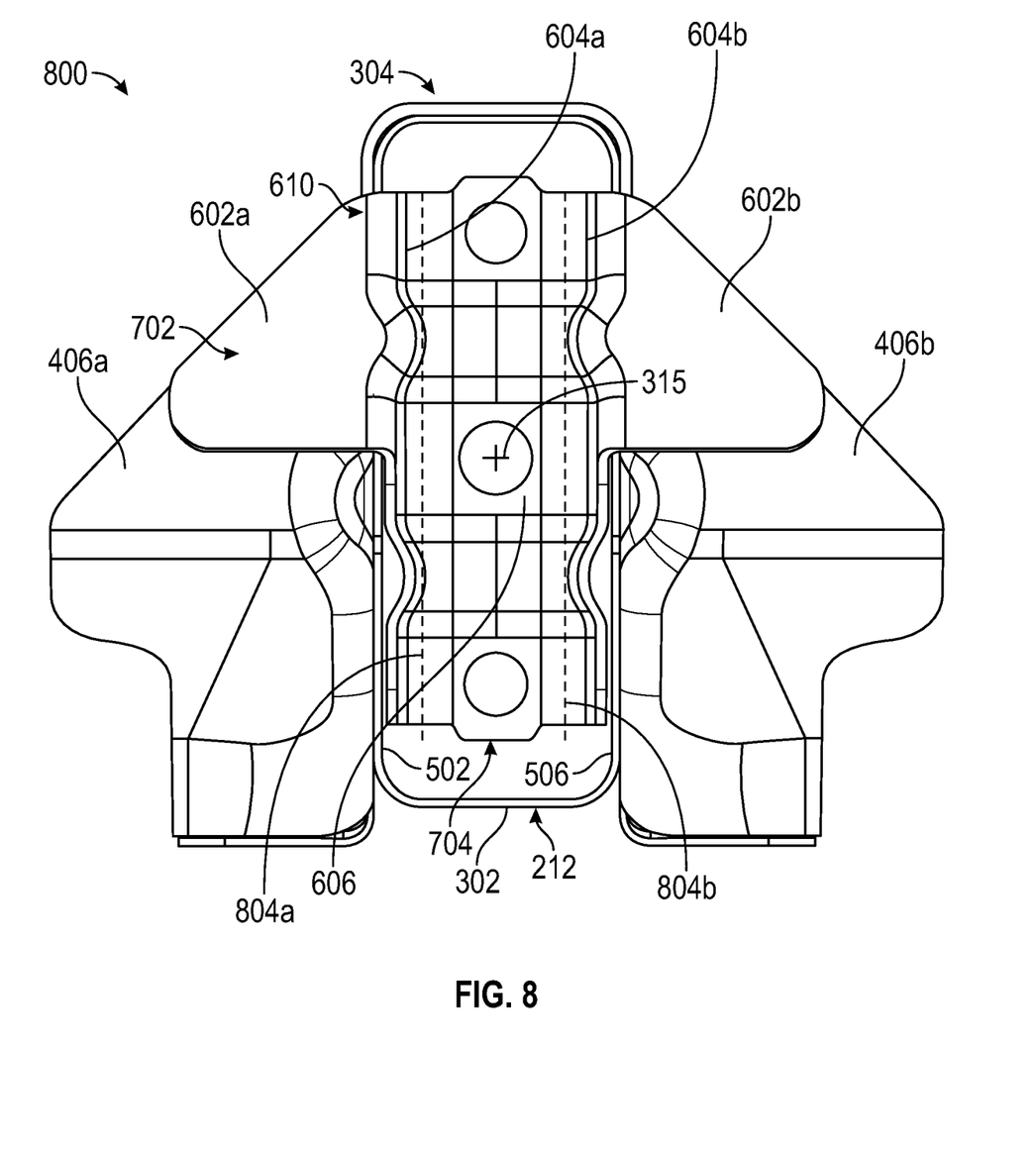
FIG. 8 shows an end view of the first beam end of the support beam with the internal stabilizer installed.

FIG. 5 further shows an illustrative bending of the body 302 that can occur when a load is applied above a buckling threshold load. The illustrative bending includes the left body side 502 buckling inward to form a first outwardly concave surface 512 and the right body side 506 buckling inward to form a second outwardly concave surface 516. FIGS. 6-8 shows an internal stabilizer 610 that can be disposed within the body 302 in order to prevent or resist this buckling.

FIG. 6 shows a perspective view 600 of the first beam end 304 of the support beam 212 with an internal stabilizer 610 disposed therein. FIG. 7 shows a side view 700 of the first beam end 304, illustrating the extension of the internal stabilizer 610 along the longitudinal axis 315 when installed at the first beam end 304. The internal stabilizer 610 is inserted into the first beam end 304 of the body 302 in order to resist buckling at the first beam end 304 when a load is applied above the buckling threshold load. Although not shown, another internal stabilizer 610 can be inserted into the second beam end 306 of the body to resist buckling at the second beam end 306.

The internal stabilizer 610 includes a first stabilizer sidewall 604a and a second stabilizer sidewall 604b opposite the first stabilizer sidewall 604a. As shown in FIG. 7, the first stabilizer sidewall 604a extends from a first stabilizer end 702 to a second stabilizer end 704, and the second stabilizer sidewall 604b extends from the first stabilizer end 702 to the second stabilizer end 704. Referring back to FIG. 6, when the internal stabilizer 610 is inserted into the through passage 510 of the body 302, the first stabilizer sidewall 604a abuts against an inner surface the left body side 502 (also referred to herein as a "first wall"), and the second stabilizer sidewall 604b abuts against an inner surface of the right body side 506, FIG. 5 (also referred to herein as a "second wall").

FIG. 8 shows an end view 800 of the first beam end 304 of the support beam 212 with the internal stabilizer 610 installed therein. As shown in FIG. 8, a bridge 606 connects the first stabilizer sidewall 604a to the second stabilizer sidewall 604b at the second stabilizer end 704 by extending across the through passage 510 of the body 302. The first stabilizer sidewall 604a includes a left stabilizer flange 602a (also referred to herein as a "first stabilizer flange") at the first stabilizer end 702, the left stabilizer flange 602a extending laterally outward. The second stabilizer sidewall 604b includes a right stabilizer flange 602b (also referred to herein as a "second stabilizer flange") at the first stabilizer end 702, the right stabilizer flange 602b extending laterally outward.

The face of the bridge 606 is perpendicular to the longitudinal axis 315 of the body 302 of the support beam 212. Referring to FIG. 7, the faces of the left stabilizer flange 602a and the right stabilizer flange 602b are oriented at an angle θ upward from the longitudinal axis 313. The orientation of the face of the left stabilizer flange 602a is the same as the orientation of the face of the left external bulkhead flange 406a when the internal stabilizer is disposed within the first beam end 304. Similarly, the orientation of the face of the right stabilizer flange 602b is the same as the orientation of the face of the second external bulkhead flange 506b. Therefore, when the internal stabilizer 610 is installed within the bore 510 at the first beam end 304, the left stabilizer flange 602a lies flush against the left external bulkhead flange 406a while the right stabilizer flange 602b lies flush against the right external bulkhead flange 406b. The left stabilizer flange 602a can be mechanically joined or welded to the left external bulkhead flange 406a and the right stabilizer flange 602b can be mechanically joined or welded to the right external bulkhead flange 406b for mechanical stability.

FIG. 8 further shows an illustrative bending of the body 302 for loads greater than the buckling threshold load up to a second threshold. The left body side 502 and the right body side 506 both remain straight, as indicated by surfaces 804a and 804b, respectively. The internal stabilizer resists buckling of the body 302 by transmitting a load along a length of the body 302.

Figure 9:
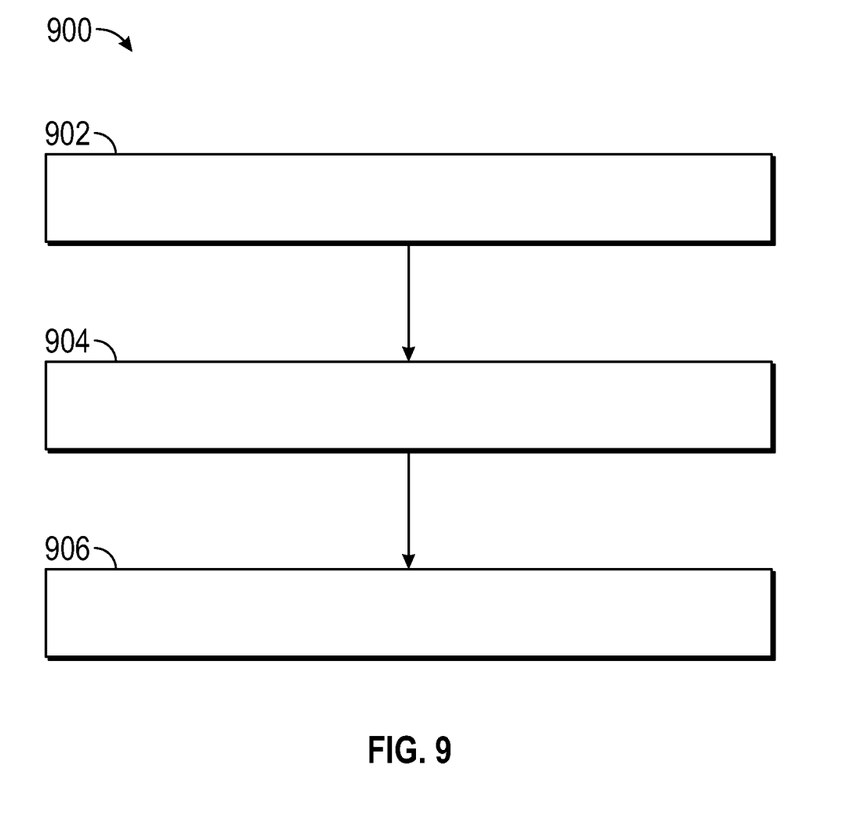
FIG. 9 shows a flowchart illustrating a method of forming the support beam.

FIG. 9 shows a flowchart 900 illustrating a method of forming the support beam. In box 902, the external bulkheads are assembled to the body 302 of the support beam. In box 904, the internal end stabilizer is placed within the bore 510 of the body 302 by sliding the bridge end of the internal end stabilizer into the first end. In box 906, the first and second stabilizer flanges 406a, 406b are mechanically joined to the first and second external bulkhead flanges 602a, 602b.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A support beam for a battery enclosure, comprising:
a body having a first beam end and a through passage; and
an internal stabilizer disposed within the through passage at the first beam end, the internal stabilizer including:
   a first stabilizer sidewall extending from a first stabilizer end to a second stabilizer end;
   a first stabilizer flange at the first stabilizer end of the first stabilizer sidewall;
   a second stabilizer sidewall extending from the first stabilizer end to the second stabilizer end;
   a second stabilizer flange at the first stabilizer end of the second stabilizer sidewall; and
   a bridge connecting the first stabilizer sidewall to the second stabilizer sidewall at the second stabilizer end, wherein the first stabilizer flange is coupled to a first external bulkhead flange of a first external bulkhead and the second stabilizer flange is coupled to a second external bulkhead flange of a second external bulkhead.

2. The support beam of claim 1, wherein the internal stabilizer is disposed in the through passage at the first beam end with the bridge at a selected distance from the first beam end.

3. The support beam of claim 1, wherein the internal stabilizer is disposed in the body with the first stabilizer sidewall in contact with an inner surface of a first wall of the body and the second stabilizer sidewall in contact with an inner surface of a second wall of the body.

4. The support beam of claim 1, wherein the first external bulkhead is coupled to an outer surface of the body and the second external bulkhead is coupled to an outer surface of the body.

5. The support beam of claim 1, wherein the internal stabilizer resists a buckling of the body by transmitting a load to along a length of the body.

6. A battery enclosure, comprising:
a base having a first sidewall and a second sidewall opposite the first sidewall; and
a support beam extending from the first sidewall to the second sidewall, the support beam comprising:
   a body having a first beam end and a through passage; and
   an internal stabilizer disposed within the through passage at the first beam end, the internal stabilizer including:
      a first stabilizer sidewall extending from a first stabilizer end to a second stabilizer end;
      a first stabilizer flange at the first stabilizer end of the first stabilizer sidewall;
      a second stabilizer sidewall extending from the first stabilizer end to the second stabilizer end;
      a second stabilizer flange at the first stabilizer end of the second stabilizer sidewall; and
      a bridge connecting the first stabilizer sidewall to the second stabilizer sidewall at the second stabilizer end, wherein the first stabilizer flange is coupled to a first external bulkhead flange of a first external bulkhead and the second stabilizer flange is coupled to a second external bulkhead flange of a second external bulkhead.

7. The battery enclosure of claim 6, wherein the internal stabilizer is disposed in the through passage at the first beam end with the bridge at a selected distance from the first beam end.

8. The battery enclosure of claim 6, wherein the internal stabilizer is disposed in the body with the first stabilizer sidewall in contact with an inner surface of a first wall of the body and the second stabilizer sidewall in contact with an inner surface of a second wall of the body.

9. The battery enclosure of claim 6, wherein the first external bulkhead is coupled to an outer surface of the body and the second external bulkhead is coupled to an outer surface of the body.

10. The battery enclosure of claim 6, wherein the internal stabilizer resists a buckling of the body by transmitting a load to along a length of the body.

11. A method of providing structural support to a battery enclosure, comprising:
    disposing an internal stabilizer within a through passage at a first beam end of a body of a support beam, the internal stabilizer including a first stabilizer sidewall extending from a first stabilizer end to a second stabilizer end, a second stabilizer sidewall extending from the first stabilizer end to the second stabilizer end, and a bridge connecting the first stabilizer sidewall to the second stabilizer sidewall at the second stabilizer end;
    coupling a first external bulkhead to a first wall of the body and a second external bulkhead to a second wall of the body opposite the first wall;
    disposing the internal stabilizer within the through passage of the body;
    coupling a first stabilizer flange of the internal stabilizer to a first external bulkhead flange of the first external bulkhead and a second stabilizer flange of the internal stabilizer to a second external bulkhead flange of the second external bulkhead; and
    connecting a first sidewall and a second sidewall of a base of the battery enclosure via the support beam.

12. The method of claim 11, further comprising disposing the internal stabilizer in the through passage at the first beam end with the bridge at a selected distance from the first beam end.

13. The method of claim 11, further comprising disposing the internal stabilizer in the body with the first stabilizer sidewall in contact with an inner surface of a first wall of the body and the second stabilizer sidewall in contact with an inner surface of a second wall of the body.

14. The method of claim 11, further comprising coupling the first external bulkhead to an outer surface of the first wall of the body and coupling the second external bulkhead to an outer surface of the second wall the body.

15. The method of claim 11, further comprising transmitting a load along a length of the body via the internal stabilizer.

\* \* \* \* \*